October 22, 1913.

DRAWING 4,348

A careful search has been made this day for the original drawing or a photolithographic copy of the same, for the purpose of reproducing the said drawing to form a part of this book, but at this time nothing can be found from which a reproduction can be made.

Finis D. Morris,
    Chief of Division E.

AWK

UNITED STATES PATENT OFFICE.

ELIJAH CONVERSE, OF CINCINNATI, OHIO.

CORN-SHELLER.

Specification of Letters Patent No. 4,348, dated January 7, 1846.

*To all whom it may concern:*

Be it known that I, ELIJAH CONVERSE, of Cincinnati, in the county of Hamilton and State of Ohio, have invented a new and useful Machine for Shelling Indian Corn from the Cob, which is described as follows, reference being had to the annexed drawings of the same, making part of this specification.

Figure 1 is a side elevation of the machine as in operation. Fig. 2 is a vertical transverse section of the machine at the line *x x* of Fig. 1. Fig. 3 is a horizontal section at the line *o o* of Fig. 1. Fig. 4 is a horizontal section on the line 1, 1, of Fig. 1.

C is a square base or foundation of the machine.

A represents four hollow columns erected upon the foundation C at the four corners thereof.

B is a horizontal circular plate or rim having four arms B' connecting it with a central plate $B^2$ and placed upon the tops of the aforesaid columns A, pierced with round holes for the insertion of four screw rods that extend vertically upward through the base and columns and circular plate to the top of a cylindrical case hereafter described—having large flat heads countersunk into the base and nuts and screws *s* on the top of the case for holding the several parts together.

K is a cylindrical curb let into a cylindrical channel or groove in the upper surface of the circular plate B—having a flange *k* on its upper edge to which the dome $K^2$ is fastened.

$K^2$ is the dome of the cylindrical case within which the operation of shelling the corn is performed, made in the form of a segment of a hollow sphere having an eye or round opening in the center through which the ears of corn are introduced, and armed upon its concave surface around said central opening with a number of radial bars *g* for stripping the corn from the cobs as they are carried around against the same by corresponding radial bars on a horizontal revolving disk.

J is a circular hopper into which the ears of corn are shoveled and by which they are conducted to the interior of the circular case to be shelled.

F is a cylindrical disk armed on the upper face with a number of radial bars G for conveying the corn around within the case and in contact with the bars *g* by which the grain is separated from the cob. It is made of less diameter than the interior of the case K within which it revolves for the purpose of forming a space $K^3$ around the disk F for the reception of the shelled corn and cobs and to give them a free passage in the direction of the arrows 3, 3 and 4 4 to the vibrating screen L.

G are the aforesaid radial bars formed on the upper surface of the disk.

E is a vertical shaft resting upon a bridge tree D and passing through a bushed opening in the central portion $B^2$ of the circular plate B—to the head of which the revolving disk F is secured and on which, between the screen and bridge tree, a pulley H is fastened for a band by which the disk is turned.

T is a screw for raising the bridge tree with the shaft and disk or runner to the height required—to correspond with the general size of the ears to be shelled.

P is a circular funnel shaped hopper placed around in the inner periphery of the circular plate B for conducting the shelled corn and cobs to the vibrating screen L suspended below it.

L is the vibrating screen for separating the corn from the cobs. It is suspended by four cords *l* to the circular plate B. Nearly one-half of the bottom of the screen, from the point S' to the point $S^2$ is depressed below the other portion of the screen. The aforesaid depressed portion of the screen is covered by a reticulated wire bottom N, whose meshes are sufficiently large to permit the shelled corn to pass through them to the depressed portion of the bottom and at the same time prevent the cobs passing through, which are discharged at the lower end beyond the point where the shelled corn is deposited at L' and $S^2$, Fig. 1, by extending the reticulated bottom beyond the lower end of the depressed bottom. The bottom of the screen has an oval opening O in it near the middle of its length surrounded by a curb Q of corresponding shape, rising above the bottom of the hopper P, to prevent the corn escaping at said opening. The shaft E of the revolving disk F passes through this opening and curb. The said curb is made of an oval or oblong shape so as to allow it to vibrate longitudinally back and forth without touching the shaft which is made cylindrical. The screen is moved by a cord or chain attached to its rear end and leading to the propelling power.

The whole machine is to be made of cast and wrought iron, or other more suitable material.

The object in having the dome or cap of the case K, within which the shelling is performed, made of a concave spherical shape as aforesaid, is in order to have a circle of chambers formed around the center opening or eye which shall gradually decrease in size from the center toward the periphery of the wheel, or outer circle of the disk, so that said chambers shall be suitable for the reception of various sized ears of corn to be shelled without the use of a concave, or concaves, supported by springs, which are constantly getting out of order. The chambers referred to are formed between the conveying bars G of the revolving disk and the shelling bars $g$ of the dome; and in their longitudinal sections form spaces nearly of a triangular form.

The disk F is put in motion by steam or other power, applied by a band, or other means, to the pulley H of the shaft E. The ears of corn are then shoveled into the hopper J promiscuously from whence they descend and pass horizontally into the aforesaid chambers formed between the radial bars G—$g$ in the direction of the arrows 2—2. Here they are met by the radial bars G and carried around with considerable velocity against the bars $g$ of the dome, which strip or shell the corn from the cobs—the cobs turning over against the bars until all the corn is shelled from them. The shelled corn and cobs are thrown by centrifugal force into the circular space $R^3$ around and outside the wheel F, which is made of sufficient capacity to allow the cobs to turn and pass down the inclined sides of the hopper P with the shelled corn in the direction of the arrows 3—3 and thence to the vibrating screen L in the direction of the arrows 4—4.

The shelled corn descends through the meshes of the screen N to the inclined board below the same which conducts it to the place of deposit below the lower end thereof while the cobs descend over the screen to the discharging end thereof. The space between the dome and disk is increased or diminished by raising or lowering the bridge-tree D, which is effected by turning the screw T in the usual manner.

What I claim as my invention and desire to secure by Letters Patent, is—

The before described manner of constructing the case—that is to say with a circle of inclined radial bars on the under side of the dome inclining downward and outward from the eye toward the base of the dome, forming, with the radial bars of the disk, a circle of triangular shaped cells for the reception and shelling of various sized ears of corn—thus doing away with the necessity of having movable concaves and boards supported by springs to accommodate themselves to the varied sizes of the ears, which springs are liable to get out of order.

ELIJAH CONVERSE.

Witnesses:
 ALBERT E. H. JOHNSON,
 JULIUS VON SCHMIDT.